AUTOMATIC LEVEL CONTROL

Filed Sept. 20, 1962 2 Sheets-Sheet 1

INVENTOR
A. L. STILLWELL
BY
Lyman Sherman
ATTORNEY

AUTOMATIC LEVEL CONTROL

Filed Sept. 20, 1962

2 Sheets-Sheet 2

INVENTOR
A. L. STILLWELL
BY
Lyman Sherman
ATTORNEY

United States Patent Office
3,156,834
Patented Nov. 10, 1964

3,156,834
AUTOMATIC LEVEL CONTROL

Albert L. Stillwell, Green Brook, N.J., assignor to Bell Telephone Laboratories, Incorporated, New York, N.Y., a corporation of New York Filed Sept. 20, 1962, Ser. No. 225,079
6 Claims. (Cl. 307—88.5)

This invention relates to high frequency electromagnetic wave transmission systems and, in particular, to automatic level controls for use in such systems in connection with nonlinear circuit elements, such as diodes.

High frequency signals, such as pump signals, used in connection with parametric amplifiers are typically obtained from a low frequency generator through a series of power amplifiers and frequency multipliers. Stabilization of the amplitude of the resulting high frequency signal is typically obtained by some sort of feedback arrangement which is responsive to changes in the level of the high frequency signal.

When diodes are used as frequency multipliers, however, it has been found that the application of prior art techniques to this control problem often results in an unstable arrangement. The major problem arises from the fact that the bias versus power output characteristic of the diode varies as a function of the input power. Not only are the characteristic curves different but there is no common limit to them. Thus, a satisfactory operating bias for one power level may fall on the negative slope portion of the operating curve at another input power level. When this occurs, the feedback loop becomes unstable and either blocks or oscillates.

It is, accordingly, an object of this invention to stabilize the amplitude of the high frequency signal derived from a diode frequency multiplier by controlling the diode bias.

It is a more specific object of this invention to automatically limit the maximum bias applied to a diode frequency multiplier as a function of the level of the signal applied to the diode.

In accordance with the principles of the invention the level of the output signal derived from a nonlinear circuit element, such as a diode, is monitored and compared with a reference signal. Deviations in the amplitude of the output signal (as compared to the reference signal) cause the bias applied to the diode to be changed. Simultaneously, the input signal to the diode is also monitored and a second signal is developed which automatically limits the maximum bias that can be applied to the diode. Thus, the diode bias is simultaneously controlled as a function of both the input and output signals thereby limiting variations in the level of the output signal and automatically stabilizing the feedback circuit.

These and other objects and advantages, the nature of the present invention, and its various features, will appear more fully upon consideration of the various illustrative embodiments now to be described in detail in connection with the accompanying drawings, in which.

Figures 1, 2:
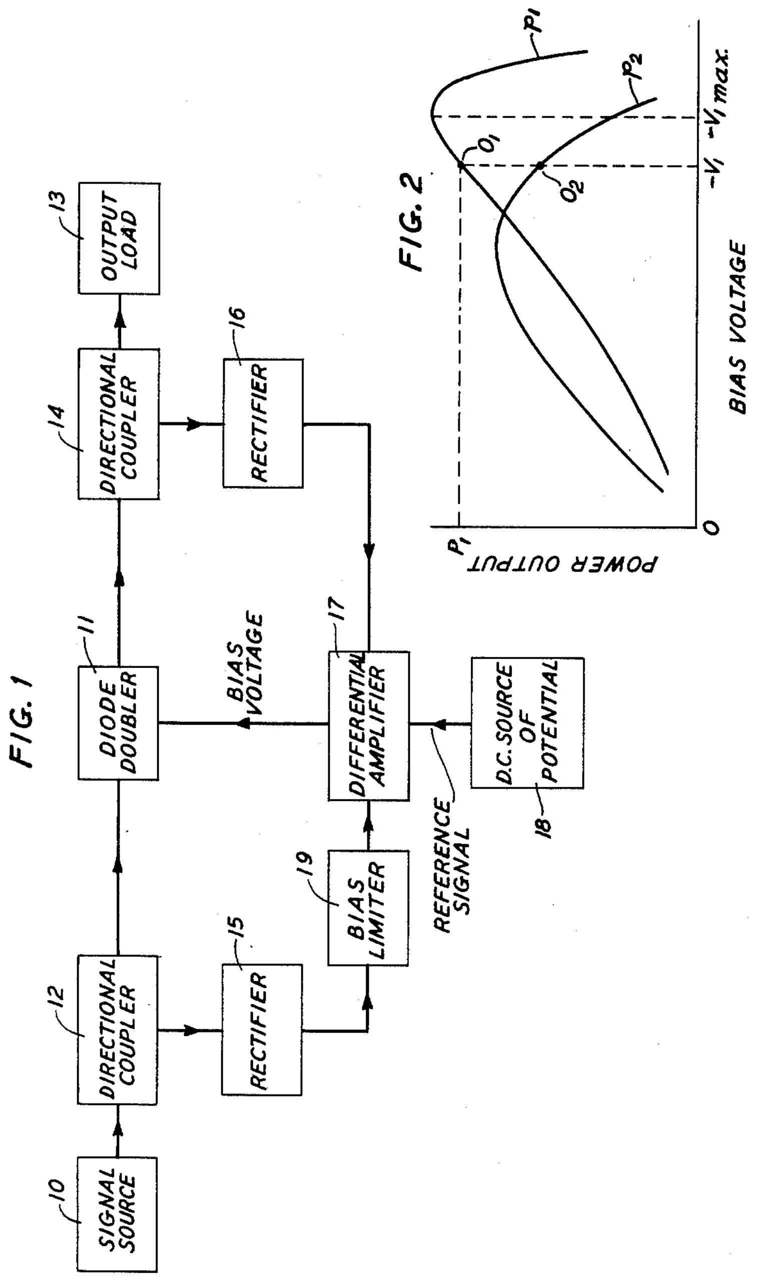
FIG. 1 shows, in block diagram, a frequency doubler incorporating an automatic level control circuit in accordance with the invention.
FIG. 2 shows, for purposes of explanation, the variations in signal output as a function of bias for different input power levels.

Referring to FIG. 1, there is shown in block diagram a frequency doubler incorporating an automatic level control circuit in accordance with the teachings of this invention. In this illustrative embodiment the diode, operating as a frequency doubler, has its output signal level controlled by varying the bias applied to it.

Referring more specifically to FIG. 1, a signal derived from a signal source 10 is coupled to a diode doubler 11 through a first directional coupler 12. The output from the diode doubler 11 is, in turn, coupled to an output load 13 through a second directional coupler 14. The load 13 is typically a parametric amplifier and the diode doubler 11 supplies pump power to the amplifier.

The output from each of the directional couplers 12 and 14, is rectified in rectifiers 15 and 16, respectively. The rectified voltage derived from rectifier 16, which is proportional to the amplitude of the output signal obtained from the diode doubler 11, is applied to a differential amplifier 17 along with a reference signal which is derived from a direct current source 18. The rectified voltage derived from rectifier 15, which is proportional to the amplitude of the input signal applied to the diode double 11, is applied to a bias limiter 19 which, in response to the rectified voltage, controls the maximum bias voltage that can be produced by the differential amplifier 17.

Before proceeding with a detailed consideration of the operation of the automatic level control circuit of FIG. 1 and a more detailed examination of some of the circuits that can be used, a consideration of the operating characteristics of the nonlinear active element that is to be controlled is in order.

FIG. 2, given for purposes of explanation, shows the manner in which the output power from a diode doubler typically varies as a function of bias voltage for two different levels of input power. In general, the maximum power output increases as the power input is increased. In addition, the bias voltage at which the maximum power point occurs shifts as a function of the input power. With the power input adjusted at some power $p_1$, a satisfactory operating point $O_1$ at bias $-V_1$ can be selected on the positive slope portion of curve $p_1$. As long as the input power remains constant and the maximum voltage remains less than $-V_{1\,max}$, the output power can be maintained substantially constant at a level $P_1$ by varying the bias about $-V_1$ to compensate for changes in the doubler circuit which might tend to decrease or increase the level of the output power. So long as the maximum bias does not exceed $-V_{1\,max}$, the circuit cannot operate over the negative slope region of the output power curve and the feedback loop is potentially stable. However, if the input power decreases to a lower level $p_2$, the operating point tends to shift towards $O_2$ which, it will be noted, is on the negative slope portion of curve $p_2$. If permited to remain there the feedback circuit becomes unstable and will either block or oscillate. Accordingly, means are provided to automatically maintain the diode operating point on the positive portion of the output curve regardless of changes in the level of the power input.

With these facts in mind, the operation of the automatic level control circuit shown in FIG. 1 can now be considered. Assuming, for the moment, a signal source 10 of constant amplitude applied to the diode doubler 11, the bias voltage applied to doubler 11 can be adjusted to deliver an output signal of a predetermined amplitude to the load 13 by setting the amplitude of the reference signal. This predetermined signal amplitude is maintained by monitoring the output signal from the diode doubler by means of directional coupler 14 and comparing the monitored signal with the reference voltage. Specifically, the output from directional coupler 14 is rectified by rectifier 16 and applied to differential amplifier 17. The rectified signal is compared with the preset reference signal derived from the direct current source 18 in differential amplifier 17. Based upon this comparison, the bias applied to the diode doubler is established. As long as there is no change in the level of the output signal from the diode doubler (and hence in the rectified signal applied to the differential amplifier) the diode bias voltage remains constant. However, if there is a change in the amplitude of the signal derived from the diode doubler due to changes in the diode circuit or in the level of the signal applied to the diode, the resulting change in the rectified output signal applied to the differential amplifier 17 causes a compensating change in the bias voltage applied to the diode.

From the discussion in connection with FIG. 2, it is known that there is a maximum value that the diode bias can be permitted to assume for a given input power to the diode. This is necessary to prevent operation on the negative slope portion of the diode output curve. Accordingly, the power input applied to the diode doubler is also monitored by means of directional coupler 12 whose output is rectified in rectifier 15 and applied to the bias limiter circuit 19. The latter circuit operates upon the differential amplifier to limit the maximum bias that can be applied to the diode. Thus, regardless of changes in the input signal level, the bias limiter maintains a safe upper limit upon the bias voltage thereby preventing instability in the automatic level control circuit.

Figure 3:
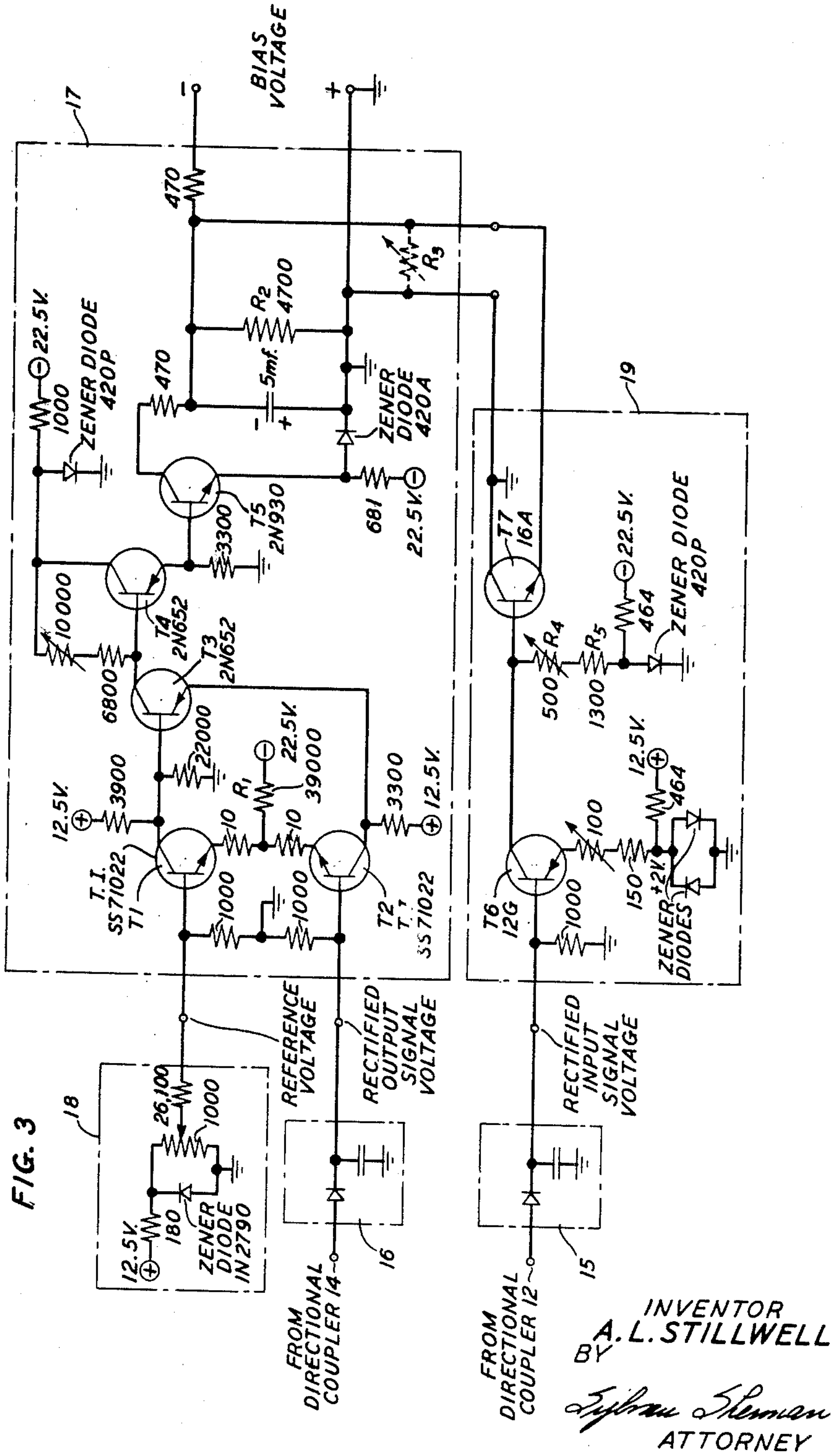
FIG. 3 is a schematic diagram of an automatic level control circuit in accordance with the invention.

FIG. 3 is a detailed circuit diagram of one embodiment of a differential amplifier and bias limiting circuit of the type that can be used to practice the invention. Such a device has been constructed and has been found to operate satisfactorily. In the embodiment of FIG. 3, transistors are used as the active elements and Zener diodes are used as voltage regulators, although vacuum tubes can be used in an analogous fashion.

Referring to the differential amplifier 17, a rectified output signal voltage derived from directional coupler 14 and rectifier 16 is applied to transistor $T_2$ of the differential amplifier. A reference voltage derived from a source of constant potential 18 is applied to transistor $T_1$. Transistors $T_1$ and $T_2$ are connected in a common emitter configuration through a common emitter resistance $R_1$. The collectors of transistors $T_1$ and $T_2$ are connected to the base and emitter electrodes, respectively, of transistor $T_3$. Depending upon the relative amplitudes of the reference voltage and the rectified output signal voltage, the current through transistor $T_3$ either increases or decreases. This change in current is transmitted through an emitter-follower stage $T_4$ to transistor $T_5$. The bias voltage applied to the diode is taken across resistor $R_2$ in the collector circuit of transistor $T_5$.

Also connected across resistor $R_2$ is the output from the bias limiter circuit 19. This latter circuit, comprising a pair of cascaded transistor stages $T_6$ and $T_7$, acts as a switch which closes automatically if the bias being supplied to the diode tends to increase above some predetermined maximum. In operation, a rectified signal derived from the input side of the doubler stage is applied to the base of transistor $T_6$. Variations in the level of the input power to the diode doubler cause variations in the current flowing through resistors $R_4$ and $R_5$ in the collector circuits of transistor $T_6$. Transistor $T_7$ compares the voltage developed across resistors $R_4$ and $R_5$ (which is proportional to the input power to the diode) to the bias voltage developed across resistor $R_2$. When the latter tends to increase to a point where the feedback circuit would tend to become unstable, current starts to flow in transistor $T_7$. This current is delivered to transistor $T_5$, thus limiting the current flow in resistor $R_2$ and thereby limiting the maximum bias voltage that can be developed across $R_2$ and applied to the diode.

Since the maximum permissible bias for any particular input signal level varies as a function of the diode being controlled, adjustable means, in the form of potentiometer $R_4$, are provided to vary the maximum biases in accordance with the particular diode requirements.

In the event that the signal source is separately regulated so that the input power levels remain essentially constant, directional coupler 12, rectifier 15 and bias limiter 19 can be eliminated. Instead, a variable resistor $R_3$ (shown dotted in FIG. 3) is placed in shunt with resistor $R_2$. Depending upon the diode characteristics and the level of the input signal, the magnitude of $R_3$ is selected to limit the maximum bias voltage that can be developed across resistor $R_2$. If the input power level is changed due to a change in the output power requirements, resistor $R_3$ is manually adjusted to maintain a safe maximum bias as explained above.

It is to be understood that the bias limiter and the differential amplifier shown in FIG. 3 are merely intended to be illustrative and that other bias control circuits can be used to practice the invention. In addition, it is to be understood that the invention can be practiced in conjunction with other types of diode circuits whose output versus bias characteristic varies as a function of the input signal level. Reference to a diode doubler made hereinbefore was merely for the purposes of illustration.

Thus, it is understood that the above-described arrangements are illustrative of only one of the many possible specific embodiments which can represent applications of the principles of the invention. Numerous and varied other arrangements can readily be devised in accordance with these principles by those skilled in the art without departing from the spirit and scope of the invention.

What is claimed is:

1. An automatic level control circuit for controlling the output signal level from a diode comprising:
   - an input signal source,
   - a diode,
   - and an output circuit,
   - first control means responsive to the level of the output signal delivered by said diode to said output circuit for varying the bias of said diode,
   - and second control means responsive to the level of the input signal delivered by said signal source to said diode for limiting the maximum bias applied to said diode.

2. The combination according to claim 1 wherein;
   - said diode has a signal output characteristic that varies as a function of the diode bias and includes a positive slope portion and a negative slope portion,
   - and wherein said second control means limits said maximum bias to said positive slope portion.

3. An automatic level control circuit comprising in cascade:
   - a signal source,
   - a diode multiplier,
   - and an output circuit,
   - a first means for monitoring the amplitude of the input signal applied to said diode multiplier by said signal source,
   - a first rectifier for rectifying the portion of the input signal derived from said first monitoring means,
   - a second means for monitoring the amplitude of the output signal applied to said output circuit by said diode multiplier,
   - a second rectifier for rectifying the portion of the output signal derived from said second monitoring means,
   - a direct current source of potential,
   - means for measuring the difference between the amplitude of the rectified signal derived from said second rectifier and the amplitude of a reference voltage derived from said direct current source of potential comprising a differential amplifier whose output is a function of said difference,
   - said difference output being used to bias said diode,
   - and bias limiting means for limiting the magnitude of said difference output coupled between said first rectifier and said differential amplifier.

4. The combination according to claim 3 wherein said differential amplifier comprises:
   - a plurality of transistors each having an emitter, a collector and a base, a first and a second of said transistors connected in a common emitter configuration through a common resistor, means for coupling the reference voltage to the base of said first transistor, means for coupling the output of said second rectifier to the base of said second transistor, means for connecting the collector of said first transistor and the collector of said second transistor to the base and emitter, respectively, of a third of said transistors, a fourth of said transistors connected in an emitter follower configuration, means for connecting the collector of said third transistor to the base of said fourth transistor, a fifth transistor connected in a common emitter configuration, means for connecting the emitter of said fourth transistor to the base of said fifth transistor, and a load resistor in the collector of said fifth transistor for developing a bias voltage for said diode, said bias voltage being proportional to the difference between said reference voltage and the rectified portion of the output signal.

5. The combination according to claim 3 wherein said bias limiting means comprises:

a pair of transistors each having an emitter, a collector and a base, the first of said transistors connected in a common emitter configuration, means for coupling the output from said first rectifier to the base of the first of said transistors, a second of said transistors connected in a common collector configuration.

means for connecting the collector of said first transistor to the base of said second transistor, and means for connecting the emitter of said second transistor to a load resistor in said differential amplifier across which the bias voltage for said diode is developed.

6. The combination according to claim 5 wherein:

the base voltage of said second transistor is a function of the amplitude of the input signal applied to said diode and the emitter voltage of said second transistor is qual to the bias applied to said diode, and wherein said second transistor conducts when said bias voltage tends to exceed said base voltage thereby limiting said bias voltage to a predetermined maximum which maximum is a function of said input signal.

References Cited in the file of this patent

UNITED STATES PATENTS 2,708,717 Holmes et al. ------------ May 17, 1955

Dedication 3,156,834.—*Albert L. Stillwell*, Green Brook, N.J. AUTOMATIC LEVEL CONTROL. Patent dated Nov. 10, 1964. Dedication filed June 5, 1972, by the assignee, *Bell Telephone Laboratories, Incorporated.*

Hereby dedicates to the Public the entire remaining term of said patent.

[*Official Gazette January 2, 1973.*]